(12) United States Patent
Siegel et al.

(10) Patent No.: US 8,182,644 B2
(45) Date of Patent: May 22, 2012

(54) PROCESS TO IMPROVE THE ADHESION BETWEEN THERMOSETTING LAMINATE AND THERMOPLASTIC SHELL

(75) Inventors: Michael C. Siegel, Liberty, MO (US); Steven L. Voeks, Smithville, MO (US)

(73) Assignee: CCP Composites US, North Kansas City, MO (US)

( * ) Notice: Subject to any disclaimer, the term of this patent is extended or adjusted under 35 U.S.C. 154(b) by 533 days.

(21) Appl. No.: 12/256,015

(22) Filed: Oct. 22, 2008

(65) Prior Publication Data

US 2009/0104410 A1 Apr. 23, 2009

Related U.S. Application Data

(60) Provisional application No. 60/981,671, filed on Oct. 22, 2007.

(51) Int. Cl.
| | |
|---|---|
| *B32B 27/00* | (2006.01) |
| *B32B 37/24* | (2006.01) |
| *B32B 1/00* | (2006.01) |
| *B32B 3/00* | (2006.01) |
| *B29C 65/00* | (2006.01) |
| *C08J 5/00* | (2006.01) |

(52) U.S. Cl. ................. 156/307.1; 156/242; 428/174
(58) Field of Classification Search .............. 156/242, 156/307.1; 428/174
See application file for complete search history.

(56) References Cited

U.S. PATENT DOCUMENTS

| | | |
|---|---|---|
| 3,051,585 A | 8/1962 | Weinberg et al. |
| 3,433,860 A | 3/1969 | Ruggles et al. |
| 3,582,388 A | 6/1971 | Stayner |
| 3,707,434 A | 12/1972 | Stayner |
| 3,720,540 A | 3/1973 | Wimmer |
| 3,833,703 A | 9/1974 | Joos |
| 4,082,882 A | 4/1978 | Weinstein et al. |
| 4,498,941 A | 2/1985 | Goldsworthy |
| 4,844,944 A | 7/1989 | Graefe et al. |
| 5,755,913 A | 5/1998 | Liaw et al. |
| 7,033,458 B2 | 4/2006 | Chang et al. |
| 7,135,233 B2 | 11/2006 | Gaggar et al. |
| 2002/0187702 A1 | 12/2002 | Delusky et al. |
| 2003/0090023 A1 | 5/2003 | Suzuki et al. |
| 2003/0143373 A1 | 7/2003 | Bledsoe et al. |
| 2004/0145092 A1 | 7/2004 | Mccollum et al. |
| 2004/0146714 A1 | 7/2004 | McCollum et al. |
| 2005/0064216 A1 * | 3/2005 | Jin et al. ................. 428/480 |

FOREIGN PATENT DOCUMENTS

| | | |
|---|---|---|
| DE | 10214827 C1 | 10/2003 |
| EP | 0002953 A2 | 7/1979 |
| EP | 528788 B1 | 7/1997 |
| GB | 2087295 | 5/1982 |
| GB | 2114466 | 8/1983 |
| GB | 2170751 A | 8/1986 |
| JP | 49006063 | 5/1972 |
| WO | 2004/067246 A2 | 8/2004 |

* cited by examiner

*Primary Examiner* — Michael Orlando
(74) *Attorney, Agent, or Firm* — Whyte Hirschboeck Dudek SC

(57) ABSTRACT

The present invention related to a process to improve the adhesion between a thermosetting laminate and a thermoplastic shell in making reinforced plastic laminates for sanitary fixtures, such as shower receptors, spas, bathtubs, sinks, lavatories and the like, and composites laminates for transportation, marine, and construction applications. The adhesion improvement is through a designed post-curing process of the cured composites laminates. The thermosetting resin used in the construction of composites laminate can be unsaturated polyester resin of any kind, vinyl ester resin, or combination of both.

25 Claims, No Drawings

PROCESS TO IMPROVE THE ADHESION BETWEEN THERMOSETTING LAMINATE AND THERMOPLASTIC SHELL

CROSS-REFERENCE TO RELATED APPLICATIONS

This application claims the benefit of U.S. provisional patent application No. 60/981,671 entitled "PROCESS TO IMPROVE THE ADHESION BETWEEN THERMOSETTING LAMINATE AND THERMOPLASTIC SHELL" filed on Oct. 22, 2007, the entirety of which is hereby incorporated by reference herein.

FIELD OF THE INVENTION

The present invention relates to a process to improve the adhesion between a thermosetting laminate and a thermoplastic shell in making reinforced plastic laminates for sanitary fixtures, such as shower receptors, spas, bathtubs, sinks, lavatories and the like, and composites laminates for transportation, marine, and construction applications.

BACKGROUND OF THE INVENTION

In the development of sanitary fixtures, such as shower receptors, spas, bathtubs, sinks, lavatories and the like, the traditional porcelain-cast iron fixtures have gradually been replaced by lighter and more resilient composite structure. A common practice in the composite manufacture is to combine the thermoplastic and thermosetting materials in finishing products. The thermoplastic materials are typically in a sheet form and can be shaped into the final profile by vacuum forming. The thermoplastic material provides the cosmetic surface of the finishing product. The thermosetting materials are typically glass fiber reinforced unsaturated polyester resins. The thermosetting materials provide structure strength for the finished product after curing. The thermosetting material may also contain inserts for additional structure strength. European Patent No. EP 002,953 describes a reinforced plastics article which comprises a layer of plastic material bonded to fibrous reinforcement, where the reinforcement may comprise a laminate of continuous strand glass fiber mat between chopped strand glass fiber mats bonded together by cured thermosetting polymer. Great Britain Patent No. GB 2,087,295 describes a close-molding process to produce the shell-like receptacle.

Although the manufacture of sanitary fixtures employs most applications for the thermoplastic/thermosetting composites, the same type of composite construction can be found in the applications of other fields. U.S. Pat. No. 4,082,882 describes a structural sandwich by combining acrylic sheet, glass fiber reinforced unsaturated polyester resin, and plywood. U.S. Patent Publication No. 2004/0146714 describes a composite construction, such as a boat hull, comprising a thermoplastic layer and a fiber glass reinforcement composite. The thermoplastic layer comprises an acrylic film having a thickness of 0.5 to 1.5 mm and an ABS layer having a thickness of 0.5 to 15 mm. Applications of thermoplastic/thermosetting composites also can be found in transportation and construction areas.

The bonding between the thermoplastic and thermosetting materials is critical for the structure integrity of the composites. Delamination between the thermoplastic and thermosetting material in composites will decrease structural strength and can result in part failure. Weak bonding between the thermoplastic and thermosetting materials may also cause blistering when the composite is submerged in water for a long period of time. Much research has been conducted to improve the adhesion of thermoplastic and thermosetting materials. The thermosetting materials also may contain fillers and other additives for ways to improve the bond between thermoplastic and thermosetting materials.

U.S. Pat. Nos. 3,582,388 and 3,707,434 describe a method for the production of rigidified plastic laminates based on acrylonitrile-butadiene-styrene (ABS) resins and acrylic resins. The ABS or acrylic sheet was less than 0.2 inch in thickness and was vacuum-formed into the final shape of article then a glass fiber reinforced unsaturated polyester resin was bonded to the plastic sheet to form the final composites. The unsaturated polyester resin contains inert organic solvent and particles for improving the bonding and stress distribution from shrinkage occurred during the cure of unsaturated polyester resin.

U.S. Pat. No. 3,720,540 uses bond-improving additives consisting of a monomeric styrene compound and chalk or talc in the thermosetting unsaturated resin to improve the bond between thermosetting material and the thermoplastic substrate, particularly when the substrate is made of acrylic or ABS material. Great Britain Patent No. GB 2,114,466 describes a process using an unsaturated polyester resin composition incorporating a blowing agent and hollow glass microspheres for promoting the bonding to the acrylic sheet. The hollow microspheres also reduce the density of the material. U.S. Pat. No. 4,844,944 uses isocyanate-modified thermosetting unsaturated mixture of polyester and polyether dense foam resin substrate layer to become bonded to the thermoplastic layer through chemical linkages. European Patent No. EP 528,788 bonds the thermoplastic shell to the fiber reinforced resin layer by a silane-based coupler. The thermosetting resin includes at least one component selected from the groups of polyester, epoxy, acrylic, vinyl esters and the blends thereof, but does not contain isocyanate.

The adhesion between polymeric substrates can be imparted by surface treatment or surface modification. U.S. Pat. No. 5,755,913 uses surface graft copolymerization to introduce functional groups which are able to undergo free radical initiated polymerization onto both polymeric surfaces. Both polymeric substrates are then brought together with the modified surfaces contact each other in the presence of liquid medium. The bonding is achieved after the liquid medium substantially dries. U.S. Patent Publication No. 2003/0090023 improves adhesion between the insert material and the base resin by coating an insert material with primer and coating surface of the primer with dope cement. The dope cement was obtained by dissolving a synthetic resin, which is compatible to the base resin, in a solvent.

Japanese Patent No. JP 49006063 describes a process to improve the bonding strength by first coating molded ABS with an acrylic polymer then laminating the body with glass mat impregnated with an unsaturated polyester or an epoxy resin. The ABS coated with an acrylic polymer is stored 24 hours at room temperature before laminated with the unsaturated polyester-impregnated glass mat. The laminated composite is stored at room temperature for 5 hours and post-cured at 60° C. for another 4 to 5 hours. This part is then stored at room temperature for another 24 hours to give a superior bonding strength compared to the part without acrylic polymer coating on ABS.

Treatment of bonded polymeric materials at the elevated temperature was used for improving the adhesion of thermoplastic materials. U.S. Pat. No. 7,033,458 improves adhesion between two adjacent layers of a laminate membrane by annealing the laminate membrane at a temperature between an α-transition temperature and a β-transition temperature of at least one polymeric component for a period of time. The adhesion improvement is accomplished through diffusion of polymeric components.

U.S. Pat. No. 7,135,233 describes a multi-layer composite structure having improved weatherability and adhesion to fiber-reinforced plastic substrate. The multi-layer composites have an outer layer of UV stabilized acrylic, a second layer of acrylate-modified acrylonitrile-styrene-acrylate rubber (ASA), a third layer of modified ABS with decreasing softening on contact with styrene, and optionally a fourth layer of polyacrylate. It is believed that the improved adhesion arises from decreased softening of the ABS by the resin of the fiberglass.

Depending on the type of thermoplastic material used in the manufacture of thermoplastic/thermosetting composites, the selection of thermosetting material is significantly influenced by adhesion consideration. Unsaturated polyester and vinyl ester resins are most commonly used for backing acrylic and ABS thermoplastic sheets. It is well known that not all types of unsaturated polyester and vinyl ester resins adhere to all types of acrylics. The thermosetting resin can be used unfilled or filled for the application. The advantage of using the filled resin is that the raw material manufacturing costs are lower. However, the addition of filler may also impact the adhesion between the thermoplastic and thermosetting materials. As a result, the adhesion issue limits the selection of thermosetting resins as well as the thermoplastic material for the construction of composites laminate.

The present invention improves the adhesion between a thermosetting laminate and a thermoplastic shell by post-curing the finished composites at elevated temperature. With this invention, no special surface treatment is needed for the surface of thermoplastic shell and various types of thermosetting resins, including high DCPD type unsaturated polyester resins, can be used in making reinforced plastic laminates. The present invention enables the manufacturer to expand the material selection for the construction of composites for various applications. A carefully designed process may also speed up the production of composites. The production costs can be lower through the combination of lower material costs and faster processing time. Another added benefit for present invention is that it allows the composite manufacturer to use MACT compliant thermosetting resins, which will reduce the volatile organic compound (VOC) emission if the laminate is made through an open molding process.

SUMMARY OF THE INVENTION

The present invention relates to a process to improve the adhesion between a thermosetting laminate and a thermoplastic shell in making reinforced plastic laminates for sanitary fixtures, such as shower receptors, spas, bathtubs, sinks, lavatories and the like, and composites laminates for transportation, marine, and construction applications. The adhesion improvement is through a designed post-curing process of the cured composites laminates. The thermosetting resin used in the construction of composites laminate can be unsaturated polyester resin of any kind, vinyl ester resin, or combination of both. The process of the present invention includes:
 a. Shaping the thermoplastic sheet by thermoforming or other forming method.
 b. Laminating behind the formed thermoplastic sheet with a thermosetting resin.
 c. Waiting until the thermosetting resin is gelled and/or reaches the peak exotherm.
 d. Putting the composite laminate through a chamber at elevated temperature.
 e. Cooling the composites laminate to ambient temperature.

The thermoplastic sheet used in the composite laminate includes acrylics, acrylonitrile-butadiene-styrene (ABS), acrylonitrile-styrene-acrylate (ASA), modified thermoplastic of these kinds, combinations of these thermoplastics in a co-extruded sheet, or any types of thermoplastic sheets that can be softened by monomers in the thermosetting resin. The thermosetting resin used in the composites laminate includes unsaturated polyester resin, vinyl ester resin, or a combination of both. The unsaturated polyester resin used in this invention can be any kind, including the high DCPD type MACT compliant unsaturated polyester resins. It was found unexpectedly, that the bonding between the thermoplastic material and the thermosetting material was greatly improved even with the thermosetting material known to have poor adhesion property, such as high DCPD type unsaturated polyester resin. The thermosetting laminate may also contain insert or core material as a general practice in composites manufacture.

The present invention allowed the composite laminate to develop strong bond strength at the end of the process, which will allow the composite manufacture to speed up the production rate. The use of MACT compliant thermosetting resin in the manufacturing process will cut the VOC emission.

DETAILED DESCRIPTION OF THE INVENTION

The construction of thermoplastic/thermosetting composite laminate includes the steps of 1) thermoforming the thermoplastic materials into the final shape; 2) laminating and 3) curing a thermosetting material onto the thermoplastic material. In the case of panel manufacturing, the step 1) is avoided. The thermoplastic material provides the cosmetic surface of the finishing product. The thermosetting material provides structural strength of the finishing product after curing. The thermosetting material is normally a fiber reinforced composite. The thermosetting laminate may also contain insert or core material as a general practice in composites manufacture.

Thermoplastic materials useful in providing a cosmetic surface include acrylic polymers, acrylonitrile-butadiene-styrene terpolymer (ABS), modified ABS, acrylonitrile-styrene-acrylate terpolymer (ASA), modified ASA, polyimide and bis-maleimide resins, ionomer resins, melamine resins, nylon homopolymer and copolymers, polyesters, phylene-based resin, polyacrylate, sulfone polymers, olefin homopolymers and copolymers, polyetheretherketone, styrene homopolymer and copolymers, polyurethane, polyvinyl and polyvinylidine halides, thermoplastic elastomers, and the like.

The thermoplastic materials may have more than one individual layer of different thermoplastic resin. For example, one or more layers of thermoplastic acrylic polymer, acrylonitrile-butadiene-styrene (ABS), acrylonitrile-styrene-acrylate (ASA), or modification of these materials may be laminated into a single thermoplastic sheet through co-extrusion or other methods commonly used in the manufacture of thermoplastic sheets. The cosmetic layer of thermoplastic is selected to have the performance characters the finished laminate composites will be used. The performance characters include weatherability, hydrolytic and chemical resistance, impact resistance, and thermo-properties. The multi-layer thermoplastic sheet should have good bonding between the thermoplastic layers. The thermoplastic material can contain any of numerous additives including inorganic and organic dyes, pigments, fillers plasticizers, antioxidants, UV stabilizer, etc., in the usual amounts. Moreover, the exposure surface of this layer can be modified of texturized in known and conventional ways.

Thermosetting materials can be used in the composites construction including the resin systems used in the free radical curing mechanism. Typical thermosetting resin systems using the free radical curing mechanism includes unsaturated polyester resin, modified unsaturated polyester, vinyl ester resin, modified vinyl ester resin, and the blends thereof. The modification for the unsaturated polyester resin or vinyl ester resin in this invention was done not for the purpose of improving the adhesion properties of thermoplastic/thermosetting composites, such as low profile/shrink additive, impact resistance modifier, flame resistance, etc. Rather, the preferable thermosetting materials are unsaturated polyester resins.

The unsaturated polyester resin has at least one dicarboxylic alkene moiety and is preferably an oligomer of an α,β-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. The unsaturated polyester resin can also be prepared from unsaturated di- or polycarboxylic acid(s) or anhydride(s) with glycols and/or polyhydric alcohol(s). Dicyclopentadiene (DCPD) may also be included in the preparation of unsaturated polyester resins. Examples of suitable saturated di- or polycarboxylic acids include isophthalic, orthophthalic, terephthalic, adipic, succinic, sebacic acid and mixtures of two or more of these compounds with isophthalic acid being preferred. Typical unsaturated carboxylic acids or anhydrides include maleic acid, fumaric acid, citraconic acid, chloromaleic acid, allyl succinic acid, itaconic acid, mesaconic acid, their anhydrides and mixtures of two or more such compounds, with maleic anhydride being the preferred choice. Examples of polyhydric alcohols which are useful in the invention include neopentyl glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol and mixtures of two or more of such compounds.

The thermosetting resin also contains one or more ethylenically unsaturated monomer capable of crosslinking the thermosetting resin via vinyl addition polymerization, examples of such monomers include, among others, aromatic compounds such as styrene, o-, m-, p-methyl styrene, alpha-methylstyrene, dichlorostyrene, vinyl naphthalene, vinyl phenol and the like, unsaturated esters, such as acrylic and methacrylic esters, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinly succinate, diallyl mateate, divinyl adipate, dichloroallyl tetrahydrophthalate, and the like, and mixtures thereof. The amount of ethylenically unsaturated monomer in thermosetting resin is typically around 25 to 55 weight percent of the resin solid and monomer. The thermosetting resin in the preferred embodiment of the invention contains 29 to 45 weight percent monomer, and most preferably contains 29 to 40 weight percent monomer.

The thermosetting resin may contain inorganic filler, such as alumina trihydrate, calcium sulfate, and/or calcium carbonate. The addition of inorganic filler can reduce the material cost, increase the flame retardancy, and reduce volatile organic emission. However, inorganic filler can detract from the adhesion of the thermosetting resin to the thermoplastic substrate. The type and amount of filler can affect the resin viscosity and cure characteristics, which will also affect the amount and performance of reinforcement used in the thermosetting laminate. The overall mechanical properties of the laminate will be different.

The curing of thermosetting resin is typically done in the ambient temperature with the oxidation/reduction mechanism. The metal catalyst is any metallic salt that will promote or accelerate the rate of cure of the thermosetting resin. Typically, these catalysts are salts of metals and organic acids. Representative metals are cobalt, manganese, vanadium, potassium, zinc and copper. The metal catalyst includes, among others, a variety of metal salt driers. Preferred metallic salt driers include the octoates, napthenates and neodeconates of cobalt, manganese, vanadium, potassium, zinc and copper. The oxidation/reduction system also contains any combination of one or more compounds selected from the following: amines, alkyl acetacetates, alkyl acetoacetamides, and alkyl and aryl acetanilides. For example, dimethyl aniline, dimethyl acetoacetate and/or ethyl acetoacetate and/or methyl acetoacetate and/or acetoacetanilide, etc. may be added.

A peroxide based co-initiator is used in conjunction with the oxidation/reduction system, to cure the thermosetting resin. These co-initiators are typically non-polyallylic peroxides. They include any of the common peroxides such as benzoyl peroxide; dialkyl or aralkyl peroxides such as di-t-butyl peroxide, dicumyl peroxide, cumylbutyl peroxide, 1,1-di-t-butyl-peroxy-3,5,5-trimethylcyclohexane, 2,5-dimethyl-2,5-di-t-butylperoxy hexane and bis(alpha-t-butylperoxy isopropylbenzene); dialkanoyl peroxides such as 2,5-dimethyl-2,5-di(2,5-diethylhexanoyl peroxy)hexane; peroxyesters such as t-butylperoxy pivalate, t-butyl peroctoate, t-butyl perbenzoate, 2,5-dimethylhexyl-2,5-di(perbenzoate), dialkylperoxymonocarbonates and peroxydicarbonates; hydroperoxides such as t-butyl hydroperoxide, p-methane hydroperoxide, pentane hydroperoxide and cumene hydroperoxide; and ketone peroxides such as cyclohexanone peroxide and methyl ethyl ketone peroxide. Typically, a methyl ethyl ketone peroxide (MEKP) co-initiator is used which consists of a solution blend of various peroxides and hydroperoxides, including monomer MEKP, dimer MEKP, cyclic trimer MEKP, and hydrogen peroxide, in an inert carrier such as dibutyl phthalate.

The curing of thermosetting resin can also be done through UV curing mechanism by adding a photoinitiator. These include photoinitiators such as benzophenone, acetophenone and its derivatives, benzoin, benzoin ethers, thioxanthones, halogenated compounds, oximes, and acyl phosphine oxides. Preferred are those photoinitiators which do not strongly discolor when exposed to sunlight, e.g. the acyl phosphine oxides and 2-hydroxy-2-methyl-1-phenylpropan-1-one.

The adhesion improvement of the one embodiment of this invention is through a designed post-curing process of the cured composites laminates. It was found unexpectedly, that the bonding between the thermoplastic material and the thermosetting material was greatly improved even with the thermosetting material known to have poor adhesion property, such as high DCPD type unsaturated polyester resin. The process of the present invention includes:
  a. Shaping the thermoplastic sheet by thermoforming or other forming method.
  b. Laminating behind the formed thermoplastic sheet with a thermosetting resin.

c. Waiting until the thermosetting resin gelled and/or reached the peak exotherm.
d. Putting the composite laminate through a chamber at elevated temperature.
e. Cooling the composites laminate to ambient temperature.

The first step of the invention is to shape the thermoplastic sheet into the final profile by thermoforming or other forming method. In the case for panel manufacturing, this step can be avoided since the plastic sheet will serve as the cosmetic surface of the finished composite. Thermoforming is the process of heating a plastic material in sheet form to its particular processing temperature and forming the hot and flexible material against the contours of a mold by mechanical means (e.g., tools, plugs, solid mold, etc.) or pneumatic means (e.g., differential in air pressure created by pulling a vacuum or using the pressure of compressed air). When held to the shape of the mold and allowed to cool, the plastic material retains the shape and detail of the mold. Detail description of the thermoforming can be found in the "Plastic Engineering Handbook of SPI" published by Van Nostrand Reinhold.

The second step of the invention is to laminate behind the formed thermoplastic sheet with a thermosetting resin. The laminating process can be done either by open molding or by close molding. The open molding process includes spray-up and hand lay-up methods, and the close molding includes wet molding, resin transfer molding (RTM), vacuum assisted RTM, and vacuum infusion molding. These molding processes are general known in the composite industry for producing parts at ambient temperature (without heating the mold). The laminate may contain insert or core material to further reinforce the composites as a general practice in composites manufacture. The laminate thickness of the thermosetting resin is typically less than ¼ inch, preferably less than ⅛ inch.

The gel time of thermosetting resin system can be anywhere from several minutes to several hours depending on the processing condition and the part configuration. The post-curing of the composite laminate typically occurs after the thermosetting laminate gels and reaches its peak exotherm. The post-curing should not be done before the thermosetting laminate reaches its gel point due to the lower resin viscosity at the elevated temperature which will cause resin run off. The post-curing may be done before the thermosetting resin reaches its peak exotherm. However, post-curing temperatures should not cause the laminate peak exotherm to exceed the glass transition temperature of the thermoplastic materials. The post-curing temperature of the invention can be from 90 to 210° F., and preferably between 110 to 190° F. The post curing time of this invention is from 5 minutes to 12 hours, preferably is from 10 minutes to 6 hours. The post-cure time is related to the post-cure temperature. The higher the post-cure temperature, the shorter the post-cure time can be. The post-curing temperature and time can be further optimized with the composite manufacturing process, so the finished composites will require a minimum post-curing time to achieve the maximum bonding strength. The finished product output will increase dramatically with the present invention.

The following examples further illustrates the invention. They are not to be taken as limiting the scope of the claimed invention. Unless stated otherwise, all percents and ratios of amounts are by weight.

Adhesion Test

The bonding between the thermoplastic and thermosetting materials is determined by performing a pull test. This type of testing does not quantify secondary bonding strength, but allows for assessment of secondary bond integrity by evaluation of the failure location and mode. The testing procedure is:

1. Prepare a thermoformed section of thermoplastic per standard production procedures. It is important to use thermoformed material since the thermoforming operation influences adhesion. Place a strip of Mylar film or other release material at one edge of the laminate to act as a failure initiation point.
2. Apply the backup laminate per standard production procedures.
3. Allow the backup laminate to cure to a Barcol hardness of at least 20.
4. Physically separates the laminate at the failure initiation point.
5. Judge the failure mode according to the following definition:
   Poor—no adhesion and with the appearance of fiber print on substrate, peels off fairly easily.
   Marginal—no adhesion but slightly harder to peel off with very minimal fiber tear on back of laminate only, still has presence of fiber print on substrate, minimal fiber on substrate.
   Good—hard to pull off and with a good amount (30-70 percent covering) of fiberglass on substrate and fiber tear on back of laminate. The presence of fiberglass on substrate signifies laminate failure, which indicates the substrate bond is stronger than the inter-laminar bond strength.
   Excellent—lot of fiber glass present (75-100 percent) or unable to completely peel off.

Thermoplastic Materials Used in Adhesion Test

Several types of thermoplastic materials were selected for the adhesion test. These materials are either commercially available from the thermoplastic sheet manufacturer or supplier by the sanitary fixture manufacture after the thermoforming process. The descriptions of these thermoplastic materials are listed below:

A. Plastics Unlimited drawn ABS/acrylic sheet—bond to ABS side
B. Solakote/555 White Smooth supplied by Allen Extruders
C. Solakote/555 Black Smooth supplied by Allen Extruders
D. Black 9504/ABS 552 Santex supplied by Allen Extruders
E. Dow 555 Blue Santex supplied by Allen Extruders
F. Plastics Unlimited drawn ABS/acrylic sheet—bond to Acrylic side Laminate Cure and Post-cure Procedures for Adhesion Test a. Room temperature (RT) cure at 77° F. for 20 hrs
b. RT cure at 77° F. for 1 week
c. RT cure at 77° F. for 2 weeks
d. 4 hrs at 150° F.
e. 3 hrs at 150° F.
f. 2 hrs at 150° F.
g. RT cure 2 weeks the 2 hrs at 150° F.
h. 2.5 hrs at 120° F.
i. 2 hrs at 120° F.
j. 1 hr at 180° F.
k. 20 min at 180° F.
l. 10 min at 180° F.
m. 3 hrs at 180° F.

Preparation of Laminates for Adhesion Test

All adhesion testing performed was done with 3 layers of 1.5 ounce continuous strand mat (CSM). Resins catalyzed with methyl ethyl ketone peroxide (DDM-9, Arkema). Gel times for the various resins ranged from 6 to 30 minutes. Adhesion samples that are post-cured are typically placed in the oven after resin gellation and during laminate exotherm or soon thereafter.

Examples 1 to 5

Preparation of Unsaturated Polyester Resins

Examples 1 to 5 were prepared following the industrial standard for preparing the unsaturated polyester resins. These resins have been promoted with cobalt octoate, co-promoters, and other additives. Various types of unsaturated polyester resins typically used for thermosetting laminating processes were selected, and these resins are commercially available from major resin suppliers as STYPOL 0404040, LHP, LSP, LGP and LAB types laminating resins from Cook Composites and Polymers (CCP). Several high DCPD unsaturated polyester resins (Examples 1 and 2), which had poor adhesion property to the thermoplastic material, were included in the tests. The low profile UP resin (example 6), OPTIPLUS 0408077 from CCP contains 10 weight % polyvinyl acetate as low profile additive in resin. The typical resin properties of these unsaturated polyester resins are listed in Table 1.

TABLE 1

Resin Properties of Examples 1 to 6.

| | Example 1 | Example 2 | Example 3 | Example 4 | Example 5 | Example 6 |
|---|---|---|---|---|---|---|
| Resin type | High DCPD UP resin | High DCPD/DEG-ISO UP Blend | End-capped Ortho UP resin | DCPD UP resin | Ortho UP resin | Low profile UP resin |
| NVM (%) | 68.0 | 66.0 | 57.3 | 57.0 | 49.0 | 49.5 |
| Viscosity (cp) | 480 | 500 | 110 | 115 | 165 | 250 |
| Cup gel time (min), 1.5% MEKP | 15.0 | 18.0 | 12.0 | 8.0 | 16.0 | 15.0 |

Examples 7 to 38

Adhesion Test Results

Examples 7 to 38 were conducted to determine the effect of material, post-cure temperature, and post-cure time to the adhesion of thermoplastic material and thermosetting laminate. The adhesion test results are listed in Table 2. The descriptions of letters representing thermoplastic material and post-cure schedule are given in previous sections. The post-cure schedules a to c are at the room temperature (no elevated temperature) with different time intervals up to 2 weeks.

TABLE 2

Adhesion Test Results

| | Ex. 7 | Ex. 8 | Ex. 9 | Ex. 10 | Ex. 11 |
|---|---|---|---|---|---|
| Thermosetting resin | Ex. 1 | Ex. 1 | Ex. 2 | Ex. 2 | Ex. 2 |
| Thermoplastic | A | A | A | A | B |
| Post-cure schedule | h | f | b | f | b |
| Adhesion test | Poor | Excellent | Poor | Excellent | Poor |

| | Ex. 12 | Ex. 13 | Ex. 14 | Ex. 15 | Ex. 16 |
|---|---|---|---|---|---|
| Thermosetting resin | Ex. 2 | Ex. 2 | Ex. 2 | Ex. 2 | Ex. 3 |
| Thermoplastic resin | B | C | C | D | A |
| Post-cure schedule | e | b | h | h | a |
| Adhesion test | Excellent | Poor | Excellent | Poor | Poor |

| | Ex. 17 | Ex. 18 | Ex. 19 | Ex. 20 | Ex. 210 |
|---|---|---|---|---|---|
| Thermosetting resin | Ex. 3 | Ex. 3 | Ex. 3 | Ex. 3 | Ex. 3 |
| Thermoplastic resin | A | C | C | D | D |
| Post-cure schedule | f | a | d | c | g |
| Adhesion test | Excellent | Poor | Excellent | Poor | Excellent |

| | Ex. 22 | Ex. 23 | Ex. 24 | Ex. 25 | Ex. 26 |
|---|---|---|---|---|---|
| Thermosetting resin | Ex. 3 | Ex. 3 | Ex. 4 | Ex. 4 | Ex. 4 |
| Thermoplastic resin | E | E | C | C | C |
| Post-cure schedule | a | d | a | l | d |
| Adhesion test | Poor | Marginal | Poor | Marginal | Excellent |

| | Ex. 27 | Ex. 28 | Ex. 29 | Ex. 30 | Ex. 31 |
|---|---|---|---|---|---|
| Thermosetting resin | Ex. 4 | Ex. 4 | Ex. 5 | Ex. 5 | Ex. 5 |
| Thermoplastic resin | F | F | A | A | B |
| Post-cure schedule | a | f | a | f | b |
| Adhesion test | Poor | Excellent | Poor | Excellent | Marginal |

| | Ex. 32 | Ex. 33 | Ex. 34 | Ex. 35 | Ex. 36 |
|---|---|---|---|---|---|
| Thermosetting resin | Ex. 5 | Ex. 5 | Ex. 5 | Ex. 5 | Ex. 5 |
| Thermoplastic resin | C | C | E | E | E |
| Post-cure schedule | a | d | a | d | m |
| Adhesion test | Poor | Excellent | Poor | Marginal | Good |

TABLE 2-continued

Adhesion Test Results

|  | Ex. 37 | Ex. 38 |
| --- | --- | --- |
| Thermosetting resin | Ex. 6 | Ex. 6 |
| Thermoplastic resin | C | C |
| Post-cure schedule | a | d |
| Adhesion test | Poor | Excellent |

The adhesion test results show that the bonding between the thermoplastic material and the thermosetting laminate was either poor or marginal before the post-cure at the elevated temperature. In some cases, the adhesion between thermoplastic material and thermosetting laminate was still poor even the after composites were put at 120° F. for 2.5 hours. Post-curing at higher temperature improved the adhesion of high DCPD resin to the thermoplastic material as indicated in examples 6 and 7. Post-curing the composites laminates at the elevated temperature at different time intervals showed adhesion improvement over longer post-cure time as indicated in examples 33, 34, and 35.

What is claimed is:

1. A process for improving adhesion between a thermosetting resin and a thermoplastic shell in making a reinforced plastic laminate, comprising:
   shaping a thermoplastic sheet to form the thermoplastic shell having a surface;
   forming a thermosetting composite laminate by applying a thermosetting unsaturated polyester resin onto the surface of the thermoplastic shell or onto an intermediate on the surface of the thermoplastic shell;
   allowing the thermosetting unsaturated polyester resin to gel and optionally reach a peak exotherm; and,
   post-curing by heating the thermosetting composite laminate at a temperature of about 90° F. to about 210° F. to form the reinforced plastic laminate.

2. The process of claim 1, wherein the thermoplastic sheet is formed by a thermoforming method.

3. The process of claim 1, wherein the thermosetting composite laminate is heated in a chamber.

4. The process of claim 1, further comprising: cooling the heated thermosetting composite laminate to ambient temperature.

5. The process of claim 1, wherein heating the thermosetting composite laminate cures the thermosetting resin.

6. The process of claim 1, wherein the thermoplastic sheet comprises a thermoplastic resin selected from the group consisting of acrylics, acrylonitrile-butadiene-styrene (ABS), acrylonitrile-styrene-acrylate (ASA), modified acrylics, modified ABS, and modified ASA.

7. The process of claim 6, wherein the thermoplastic sheet comprises a combination of the thermoplastic resins in a co-extruded sheet.

8. The process of claim 1, wherein the thermoplastic sheet comprises a thermoplastic resin that can be softened by monomers in the thermosetting resin.

9. The process of claim 1, wherein the thermosetting resin further comprises a vinyl ester resin.

10. The process of claim 9, wherein the unsaturated polyester resin comprises a high DCPD-type unsaturated polyester resin.

11. The process of claim 9, wherein the thermosetting resin comprises a thermosetting resin system that comprises a monomer at an inclusion amount of about 25 to about 55 weight percent, based on the total weight of the thermosetting resin system.

12. The process of claim 11, wherein the thermosetting resin system comprises about 29 to about 45 weight percent monomer, based on the total weight of the thermosetting resin system.

13. The process of claim 11, wherein the thermosetting resin system comprises about 29 to about 40 weight percent monomer, based on the total weight of the thermosetting resin system.

14. The process of claim 11, wherein the thermosetting resin system is a filled system.

15. The process of claim 11, wherein the thermosetting resin system is an unfilled system.

16. The process of claim 11, where the thermosetting resin system includes a low profile resin.

17. The process of claim 1, wherein the thermosetting composite laminate is a fiber reinforced composite.

18. The process of claim 1, wherein the thermosetting composite laminate comprises an insert or core material.

19. The process of claim 1, wherein the thermosetting composite laminate is formed by an open molding process.

20. The process of claim 1, wherein the thermosetting composite laminate is formed by a closed molding process.

21. The process of claim 1, wherein the thermosetting resin of the thermosetting composite laminate has a thickness less than about 1/4 inch.

22. The process of claim 1, wherein the thermosetting resin of the thermosetting composite laminate has a thickness less than about 1/8 inch.

23. The process of claim 3, wherein the thermosetting composite laminate is heated inside the chamber at a temperature of about 110° F. to about 190° F.

24. The process of claim 3, wherein the thermosetting composite laminate has a residence time inside the chamber from about 5 minutes to about 12 hours.

25. The process of claim 3, wherein the thermosetting composite laminate has a residence time inside the chamber from about 10 minutes to about 6 hours.

* * * * *